(12) United States Patent
Tanaka et al.

(10) Patent No.: US 6,821,680 B2
(45) Date of Patent: Nov. 23, 2004

(54) BATTERY SEPARATOR, PROCESS FOR PRODUCING THE SAME, AND ALKALINE BATTERY

(75) Inventors: Toshio Tanaka, Otsu (JP); Hiroki Yamaguchi, Moriyama (JP); Naohiko Takimoto, Otsu (JP); Masahiro Yamashita, Otsu (JP); Shiro Hamamoto, Muko (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 235 days.

(21) Appl. No.: 10/117,106

(22) Filed: Apr. 8, 2002

(65) Prior Publication Data

US 2002/0160260 A1 Oct. 31, 2002

Related U.S. Application Data

(62) Division of application No. 09/540,969, filed on Mar. 31, 2000, now Pat. No. 6,403,265.

(30) Foreign Application Priority Data

| Apr. 2, 1999 | (JP) | ............................................. 11-96545 |
| Apr. 2, 1999 | (JP) | ............................................. 11-96546 |
| Nov. 9, 1999 | (JP) | ........................................... 11-318840 |

(51) Int. Cl.$^7$ .............................................. H01M 2/16
(52) U.S. Cl. ........................ 429/249; 429/142; 429/144; 429/145; 429/247; 429/248; 429/254
(58) Field of Search ................................ 429/247, 248, 429/249, 254, 142, 144

(56) References Cited

U.S. PATENT DOCUMENTS

| 3,972,759 A | * | 8/1976 | Buntin ........................ 156/167 |
| 4,000,967 A | * | 1/1977 | Johnson et al. ............ 8/115.53 |
| 6,413,667 B1 | * | 7/2002 | Gozdz ......................... 429/62 |

FOREIGN PATENT DOCUMENTS

| JP | 07-278963 | 10/1995 |
| JP | 08-284019 | 10/1996 |
| JP | 10-116600 | 5/1998 |
| JP | 10-326607 | 12/1998 |

OTHER PUBLICATIONS

Database WPI Section Ch, Week 200032, Derwent Publication Ltd., London, GB; AN 2000–372184 XP002145272 and JP 2000 123814 A (Toyobo KK), Apr. 28, 2000.

Patent Abstracts of Japan, vol. 013, No. 404 (E–817), Sep. 7, 1989 and JP 01–146270 A (Matsushita Electric Ind. Co., Ltd.) Jun. 8, 1989.

Patents Abstracts of Japan, vol. 1999, No. 10, Aug. 31, 1999 and JP 11–144698 A (Miki Tokushu Seishi KK), May 28, 1999.

Database WPI Section Ch, Week 199920 Derwent Publications Ltd., London, GB; AN 1999–238533 XP002145273 and JP 11–067182 A (Tonen Tapirusu KK), Mar. 9, 1999.

* cited by examiner

*Primary Examiner*—Dah-Wei Yuan
(74) *Attorney, Agent, or Firm*—Kenyon & Kenyon

(57) ABSTRACT

A battery including a separator having a satisfactory ammonia trapping property is speculated to exhibit a less self-discharge and a higher capacity-holding rate. The ammonia trapping property is speculated to be increased with an increasing degree of sulfonation of a constitutive polyolefin fiber. However, a highly sulfonated conventional polyolefin has a deteriorated fiber strength and highly sulfonated portions thereof are peeled or eliminated, and the resulting fiber cannot have a significantly high degree of sulfonation. The invention is therefore intended to provide a separator having an improved ammonia trapping property. The invented separator includes a polyolefin resin fiber having large amounts of introduced sulfonic groups. Specifically, the separator is one containing a fiber obtained by sulfonating a polyolefin resin fiber having an intrinsic viscosity number of 0.2 to 1.0 dl/g, one including a fiber obtained by sulfonating a polyolefin resin fiber and having a BET specific surface area of 0.5 m$^2$/g or more, or one including a fiber obtained by oxidizing a polyolefin fiber and sulfonating the oxidized fiber.

9 Claims, No Drawings

BATTERY SEPARATOR, PROCESS FOR PRODUCING THE SAME, AND ALKALINE BATTERY

CROSS REFERENCE TO RELATED APPLICATIONS

This is a Divisional of application Ser. No. 09/540,969 filed Mar. 31, 2000 now U.S. Pat. No. 6,403,265.

BACKGROUND OF THE INVENTION

1. Field of the Invention

The present invention relates to battery separators, to processes for producing the battery separators, and to alkaline batteries using the battery separators. Such alkaline batteries, in particular, alkaline secondary batteries, are employed as batteries in, for example, electric vehicles and electric tools.

2. Description of the Related Art

Batteries generally include, as components, a positive electrode, a negative electrode, an electrolyte, a separator, and a battery jar. The positive and negative electrodes are separated by the separator from each other, are immersed in the electrolyte and are housed in the battery jar. As the separator, non-woven fabrics made of polyamide fibers, polypropylene fibers or acrylic fibers are generally employed.

In addition to the properties of the positive and negative electrodes and of electrolyte, the properties of the separator also significantly affect the characteristic of the battery, and various attempts have been made to improve the properties of such separators.

Of controls of such battery characteristics, demands have been made in recent years to sufficiently control self-discharge in nickel metal hydride batteries and other alkaline batteries, as these alkaline batteries exhibit a relatively large self-discharge.

The self-discharge is known to be caused by nitrate groups, and such nitrate groups are formed by the oxidation of ammonia contaminating a battery. The reduction of ammonia in a battery can reduce the amount of the nitrate groups to thereby suppress the self-discharge. However, ammonia is liable to contaminate a battery in a production process of electrodes and contamination of the battery with ammonia cannot be completely prevented.

Consequently, a technique has been proposed, which comprises grasping or trapping the contaminated ammonia in a battery by a separator before the ammonia is converted into a nitrate group. By this technique, free ammonia is reduced to thereby reduce the formation of nitrate groups.

For example, Japanese Unexamined Patent Publication No. 10-116600 discloses a separator made of a polyolefin fiber which is grafted with a vinyl monomer. In this technique (hereinafter referred to as "the conventional technique 1"), the resulting separator absorbs and holds ammonia and other nitrogen-containing components.

In the conventional technique 1, ammonia is trapped basically by carboxyl groups. However, the carboxyl groups are highly liable to be selectively combined with potassium ions that are present in large amounts in the electrolyte, and the carboxyl groups trap ammonia only in small amounts. In addition, such a separator which has been converted into hydrophilic by treatment with a vinyl monomer has a poor heat resistance. For example, constitutive acidic groups in the separator are eliminated from the separator at relatively high temperatures, for example, at 60° C., and a satisfactory ammonia trapping property cannot be significantly maintained.

As an another candidate for separators, a separator made of a sulfonated polypropylene is proposed in Proceedings of The 28th Battery Symposium in Japan (page 113, 1987) (hereinafter referred to as "the conventional technique 2"). This literature states that the use of such a non-woven fabric separator made of a sulfonated polypropylene exhibits a less self-discharge and a higher rate of holding a battery capacity than conventional polyamide separators.

However, the separator proposed in the conventional technique 2 is directed not to positively trapping ammonia but to suppress nitrogen impurities from releasing or eluting out of the separator. In fact, the results in an experiment stated in the above conventional technique 2 show that the proposed separator has an insufficient ammonia trapping property. Demands have been therefore made to improve the ammonia trapping property of a separator made of a sulfonated polypropylene.

A possible solution to improve the ammonia trapping property is introduction of large amounts of sulfonic groups into a matrix polymer. However, fibers made of polyolefin resins are highly resistant to acids, and if sulfonic groups are introduced into the fibers to a great extent, the introduced sulfonic groups are unevenly distributed. In other words, the resulting fibers have portions where large amounts of sulfonic groups are introduced and portions where relatively less amounts of sulfonic groups are introduced. The portions where large amounts of sulfonic groups are introduced will have a markedly deteriorated strength and may be collapsed and eliminated from the separator. Consequently, a separator having large amounts of sulfonic groups cannot be significantly obtained. Furthermore, such fibers are liable to be cut in portions having a deteriorated strength and therefore have a low fiber strength. The resulting separator using these fibers having a low strength may be cut in a winding process, in which the separator is wound up into a battery, or in other processing and assembly steps of the separator into the battery.

Regarding thermal stability, the sulfonated separator according to the conventional technique 2 has a higher thermal stability than the carboxylated separator according to the conventional technique 1. However, yet some amounts of sulfonic groups will be inevitably eliminated by heating, and such elimination of sulfonic groups is liable to occur particularly in highly sulfonated portions. In other words, uneven introduction of sulfonic groups in a separator will result in marked elimination of the sulfonic groups by heating, and a satisfactory ammonia trapping property cannot be stably maintained.

Japanese Unexamined Patent Publication No. 10-326607 (hereinafter referred to as "the conventional technique 3") teaches that a sulfur concentration can be used as an index of a degree of sulfonation and describes a separator having a sulfur concentration of 7 mg/g in an example. This relatively high sulfur concentration is considered to be obtained by composing the fiber from a constitutive monofilament having a markedly small fineness of 0.01 to 0.1 denier (corresponding to 0.011 to 0.11 decitex) to thereby have a large surface area. Specifically, the fiber is to have large total amounts of sulfonic groups introduced therein by increasing the surface areas of constitutive fibers.

However, such a separator made of a polypropylene fiber having a monofilament fineness of 0.01 to 0.1 denier (0.011 to 0.11 decitex) should be inevitably obtained by a following process, as is described in the above publication. That is, a polypropylene fiber having a fineness of 0.01 to 0.1 denier (0.011 to 0.11 decitex) is obtained by sulfonating a material fibrous mixture comprising an island-in-sea type composite fiber and an olefinic binder fiber, where island-in-sea type composite fiber comprises a polyamide resin as a sea component and a polypropylene as an island component, and then dissolving and eliminating the polyamide resin. According to this production process, the polyamide resin in the center of the island-in-sea type composite fiber cannot be completely eliminated by a sulfonation treatment alone, and the residual polyamide will cause the self-discharge of the battery instead.

In addition, an oxygen gas is formed in the positive electrode at a terminal stage of battery charging, but the use of ultrafine fibers having a fineness of 0.01 to 0.1 denier (0.011 to 0.11 decitex) in a separator results in an extremely low gas permeability and the separator permeates only an insufficient amount of oxygen gas from the positive electrode into the negative electrode. The accumulated oxygen gas will cause the expansion of the battery, resulting in leakage of the electrolyte or further explosion of the battery. Such ultrafine fibers have a very low fiber strength and are liable to break to thereby create a risk of a short-circuit.

In the conventional technique 3, the sulfonic group introduction is optimized from the viewpoint of affinity for the electrolyte alone, but is not optimized from the viewpoint of ammonia trapping property.

Aside from the above process of dissolving a sea component of an island-in-sea type composite fiber to yield ultrafine fibers, the use of divided fibers as ultrafine fibers is proposed, for example, in Japanese Unexamined Patent Publication No. 8-284019 (hereinafter referred to as "the conventional technique 4"). When these ultrafine fibers are highly sulfonated, the fiber strength is greatly deteriorated. The fibers of a resulting battery will therefore break inside the battery to yield pinholes to thereby cause a short-circuit.

Japanese Unexamined Patent Publication No. 7-278963 (hereinafter referred to as "the conventional technique 5") proposes a battery separator made of a fiber that can be sulfonated under mild conditions. The fiber is a fiber containing a modified styrenic polymer component whose glass transition temperature is lowered 5° C. or more. However, even if a fiber mixture includes a fiber that can be readily sulfonated, a total sulfur content in the resulting fiber is about 270 ppm, and is at the maximum about 800 ppm (i.e., 0.8 mg per 1 g of the separator) in case that the fiber is extremely sulfonated thereby lowering the fiber strength, as is stated in the publication of the conventional technique 5. For example, a result in an example shown in the conventional technique 5 where the resulting fiber is to have a practical strength indicates that the fiber has a sulfur content of only 10 ppm or less.

As thus described, a highly sulfonated fiber, i.e., a fiber having a higher sulfur content is expected to have an improved ammonia trapping property. However, if large amounts of sulfonic groups are to be introduced into a fiber made of a polyolefin resin, portions having a high concentration of sulfonic groups are collapsed and eliminated from the fiber to thereby yield a separator having less amounts of sulfonic groups. Separately, when an ultrafine fiber is sulfonated, the strength of the sulfonated fiber is markedly deteriorated and pinholes and other defects may form in the separator.

The present invention has been accomplished under these circumstances, and an object of the invention is to provide a battery separator having an improved ammonia trapping property without a significant strength deterioration of constitutive fibers of the separator. Another object of the invention is to provide an alkaline battery exhibiting a less self-discharge and having a satisfactory capacity-holding rate by using the above separator. It is a further object of the invention to provide a process for producing a battery separator which has an improved ammonia trapping property.

SUMMARY OF THE INVENTION

The invented battery separator includes polyolefin resin fibers having large amounts of sulfonic groups introduced therein and can be classified into the following three aspects. Specifically, in a first aspect, the invented battery separator includes a fiber obtained by sulfonating a polyolefin resin fiber having an intrinsic viscosity number of 0.2 to 1.0 dl/g. The invented battery separator in a second aspect includes a sulfonated fiber obtained by sulfonating a polyolefin resin fiber and having a specific surface area as determined according to the Brunauer-Emmett-Teller equation (hereinafter briefly referred to as "BET specific surface area") of 0.5 $m^2$/g or more. The invented battery separator in a further aspect includes a polyolefin resin fiber having sulfonic groups introduced substantially uniformly onto the surface of the fiber.

In a fourth aspect relating to the invented battery separator in the third aspect, the invention provides a process for producing a battery separator. The process includes the steps of oxidizing a surface of a polyolefin fiber to form a site on the surface where the surface of fiber can be easily sulfonated and sulfonating the oxidized fiber.

In addition and advantageously, the invention provides, in a fifth aspect, an alkaline battery including the invented battery separator to separate positive and negative electrodes from each other.

DESCRIPTION OF THE PREFERRED EMBODIMENTS

After intensive investigations, the present inventors found that sulfonated portions of highly sulfonated fibers collapse because polyolefin resin fibers widely used in conventional separators have a high intrinsic viscosity number. Such conventional polyolefin resin fibers include, for example, spunbonded fibers made of a polypropylene and sheath-core composite fibers made of a polypropylene and a polyethylene. The polyolefin resin fibers having a high intrinsic viscosity number are widely used from the viewpoint that they can be easily spun. However, the polyolefin resin fibers having a high intrinsic viscosity number are highly resistant to acids and if they are forced to be sulfonated, the resulting sulfonated portions are liable to collapse and to be eliminated from the fibers. The resulting fibers therefore have less amounts of sulfonic groups and have a deteriorated strength.

The present inventors found that a polyolefin resin fiber having an intrinsic viscosity number in a specific range allows to yield a separator having an improved ammonia trapping capacity without collapse of the surface of the fiber even if the fiber is sulfonated. The following first aspect of the invention has been accomplished based on these findings.

Specifically, the invented battery separator according to the first aspect includes a fiber obtained by sulfonating a polyolefin resin fiber having an intrinsic viscosity number of 0.2 to 1.0 dl/g.

In this aspect, the separator may be composed of a non-woven fabric uniformly containing the aforementioned fiber or may be a laminated separator comprising at least one ply of an ammonia trapping non-woven fabric mainly containing the fiber and at least one ply of a reinforcing non-woven fabric other than the ammonia trapping non-woven fabric. The laminated separator has only to include at least one ply of the ammonia trapping non-woven fabric and one ply of the reinforcing non-woven fabric, and a variety of combinations of both components can be employed. For example, the laminated separator may comprise each two or more plies of the ammonia trapping non-woven fabric and the reinforcing non-woven fabric or may comprise two plies of the ammonia trapping non-woven fabric and one ply of the reinforcing non-woven fabric.

When the polyolefin resin fiber having an intrinsic viscosity number of 0.2 to 1.0 dl/g is sulfonated with sulfuric acid or another sulfonating agent, large amounts of sulfur atoms such as sulfonic groups can be introduced into the fiber without deteriorating mechanical strengths of the polyolefin resin and avoids, for example, collapse of the fiber. Such introduced sulfur atoms can serve as sites for trapping ammonia. In other words, the sulfur content in the fiber can be increased without reducing the fineness of the fiber and without increasing the surface area of the fiber. Accordingly, a polyolefin resin fiber having a high sulfur content can be obtained not according to such a production process as the conventional technique 3. Further, without a significant fiber strength deterioration, the resulting separator can avoid a short-circuit caused by the breakage of the constitutive fiber in the separator when the separator is mounted into a battery.

Reasons and mechanisms why the polyolefin resin fibers having an intrinsic viscosity number within the above-specified range can possess large amounts of ammonia trapping sites have not yet been clarified in detail, but are supposed as follows.

(1) The crystal structure of the polyolefin resin is disturbed in a sulfonation process to form micro gaps in the crystal.

(2) Sulfur atoms introduced in the sulfonation process serve to cross-link the polyolefin resin to form "a cross-linked microstructure".

(3) The micro gaps are fixed by the cross-link and do not disappear even by the action of thermal motion of molecules to thereby form and fix micropores.

(4) The sulfur atoms constituting the cross-link highly interact with ammonia and the ammonia adsorbed by the micropores is not eliminated and is firmly fixed.

The micropores are markedly formed when a polyolefin resin having an intrinsic viscosity number ranging from 0.2 to 1.0 dl/g is sulfonated, and permit the sulfonating agent to migrate into the inside of the fiber to thereby permit large amounts of sulfur atoms to be introduced. It has been found that the micropores adsorb ammonia but hardly adsorb potassium and other ionic substances. As a result, the micropores can selectively adsorb ammonia and the resulting fiber has a very satisfactory ammonia trapping property.

The intrinsic viscosity number of the polyolefin resin is preferably in a range from 0.3 to 1.0 dl/g and more preferably from 0.4 to 0.9 dl/g. The intrinsic viscosity number is determined by the use of a tetralin solvent as state below.

As the other fiber than the polyolefin resin fiber for use in the separator, fibers having satisfactory strengths can be advantageously employed to further reinforce the overall separator. In this case, the separator preferably comprises 80% by mass or less of the polyolefin resin fiber and the balance of the reinforcing fiber.

In the separator according to the first aspect, the sulfonated fiber obtained by sulfonating a polyolefin resin fiber having an intrinsic viscosity number of 0.2 to 1.0 dl/g should preferably have a total sulfur content of more than 10 mg and equal to or less than 50 mg per 1 g of the fiber.

The sulfur content can serve as an index of an ammonia trapping property, and a total sulfur content exceeding 10 mg per 1 g of the fiber yields a high ammonia trapping rate. It has been already known that the higher the sulfur content is, the higher the ammonia trapping property is. However, such a separator composed of a fiber having a total sulfur content exceeding 10 mg per 1 g of the fiber has not yet been obtained according to conventional techniques, and naturally, the relationship between the separator having a total sulfur content exceeding 10 mg and the ammonia trapping property has not been examined. The present inventors have now provided the separator comprising a fiber having a total sulfur content exceeding 10 mg per 1 g of the fiber and have found that the separator has an improved ammonia trapping rate.

In contrast, if the total sulfur content exceeds 50 mg per 1 g of the fiber, a significantly improved ammonia trapping rate is not expected and the strength of the resulting fiber is markedly deteriorated even according to the invented process. The total sulfur content should be therefore preferably 50 mg or less, more preferably 30 mg or less and particularly preferably 20 mg or less per 1 g of the fiber.

The invented separator according to the first aspect preferably comprises 20% by mass or more of the sulfonated fiber obtained by sulfonating a polyolefin resin fiber having an intrinsic viscosity number of 0.2 to 1.0 dl/g.

The separator preferably comprises 20% by mass or more and more preferably 30% by mass of the fiber having such a high sulfur content. The resulting separator can satisfactorily trap ammonia to thereby reduce the self-discharge and increase the capacity-holding rate.

The present inventors made further investigations on sulfonated polyolefin resin fibers having a specific intrinsic viscosity number and on the other sulfonated polyolefin resin fibers, and found that fibers having a specific surface area of 0.5 $m^2$/g or more due to the formation of numerous pores in the sulfonated fibers are capable of satisfactorily trapping ammonia. The following second aspect of the invention has been accomplished based on these findings.

Specifically, the invented battery separator according to the second aspect comprises a sulfonated fiber obtained by sulfonating a polyolefin resin fiber and having a BET specific surface area of 0.5 $m^2$/g or more.

In the present aspect, the fiber having a specific surface area of 0.5 $m^2$/g or more may be uniformly incorporated into a separator made of a non-woven fabric. Alternatively, the separator may be a laminated separator comprising at least one ply of an ammonia trapping non-woven fabric mainly containing the aforementioned fiber and at least one ply of another reinforcing non-woven fabric. That is, the separator may be a laminated separator obtained by laminating at least one ply of an ammonia trapping non-woven fabric mainly containing the fiber obtained by sulfonating a polyolefin resin fiber and having a BET specific surface area of 0.5 $m^2$/g or more and at least one ply of another. reinforcing non-woven fabric. The laminated separator has only to include at least each one ply of the ammonia trapping non-woven fabric and of the reinforcing non-woven fabric, and a variety of combinations of both components can be employed as in the first aspect. For example, the laminated separator may comprise each two or more plies of the ammonia trapping non-woven fabric and the reinforcing non-woven fabric or may comprise two plies of the ammonia trapping non-woven fabric and one ply of the reinforcing non-woven fabric.

It is supposed that the numerous pores are formed in the fiber by sulfonation to yield a fiber having a specific surface area of 0.5 m$^2$/g or more in accordance with the aforementioned mechanisms (1) to (4). It is also supposed that the formed pores are not voids of micrometer order as in voids between fibers but are ultrafine micropores of an average diameter of several nanometers and that these micropores can specifically trap ammonia.

Particularly, the sulfonated fiber should be obtained by sulfonating a low molecular weight polyolefin resin fiber having an intrinsic viscosity number of preferably from 0.2 to 1.2 dl/g, more preferably from 0.2 to 1.0 dl/g, and particularly preferably from 0.3 to 0.9 dl/g. The sulfonated fiber has fine micropores with an average diameter of several nanometers (e.g., about 2 nanometers) and can have numerous micropores in the fiber to thereby trap ammonia satisfactorily.

The average pore size of the pores of the fiber has not been clarified in detail but is preferably such a size that can adsorb ammonia. Practically, the average pore size should preferably fall in a range from about 0.5 to 10 nm and more preferably from about 1 to 5 nm.

The fiber preferably has a BET specific surface area of 1 m$^2$/g or more and more preferably 2 m$^2$/g or more to exhibit a satisfactory ammonia trapping property.

In the invented battery separators according to the first and second aspects, the reinforcing non-woven fabric preferably mainly comprises a fiber obtained by sulfonating a polyolefin resin fiber having an intrinsic viscosity number of more than 1.0 dl/g.

As stated above, by the use of, for example, a polyolefin resin fiber having a specific low intrinsic viscosity number in the first aspect, the ammonia trapping non-woven fabric for use in the invented battery separator can relatively suppress the deterioration of the fiber strengths even if the fiber is sulfonated. When the fiber is extremely highly sulfonated, yet the strength of the fiber is deteriorated to some extent. However, such deterioration in strength of the fiber can be supplemented by laminating the reinforcing non-woven fabric for reinforcement, and overall strengths of the separator can be thus increased.

The reinforcing non-woven fabric preferably mainly comprises a fiber obtained by sulfonating a polyolefin resin fiber having an intrinsic viscosity number of more than 1.0 dl/g. The fiber just mentioned above is not significantly sulfonated and can maintain its strength even when the fiber is sulfonated to such an extent as in the ammonia trapping non-woven fabric. The reinforcing non-woven fabric containing the fiber can sufficiently reinforce the ammonia trapping non-woven fabric. When the ammonia trapping non-woven fabric and the reinforcing non-woven fabric have such different sulfonation properties from each other, one sulfonation treatment allows the ammonia trapping non-woven fabric requiring more sulfonation to be sulfonated more and allows the reinforcing non-woven fabric to be sulfonated to a minimal extent to impart hydrophilic property to the reinforcing non-woven fabric.

The polyolefin resin fiber for use in the reinforcing non-woven fabric should more preferably have an intrinsic viscosity number of more than 1.2 dl/g, and particularly preferably of more than 1.5 dl/g.

The reinforcing non-woven fabric for use in the invented battery separators according to the first and second aspects preferably mainly comprises a polyolefin resin fiber having a total sulfur content of 7 mg or less and more than 0 mg per 1 g of the fiber.

A reinforcing non-woven fabric for reinforcing the separator mainly containing a polyolefin resin fiber having a total sulfur content of 7 mg or less per 1 g of the fiber is sulfonated less and maintains the strength more than the ammonia trapping non-woven fabric. The total sulfur content of the fiber of the reinforcing non-woven fabric is more preferably 5 mg or less and more than 0 mg per 1 g of the fiber.

When the polyolefin resin fiber which is sulfonated to some extent and has a total sulfur content of 7 mg/g or less and more than 0 mg/g is used as the reinforcing non-woven fabric instead of a non-sulfonated polyolefin fiber, the resulting reinforcing non-woven fabric is preferable to have a satisfactory affinity (wettability) for electrolytes. In addition, such a satisfactory affinity of the laminated reinforcing non-woven fabric for electrolytes does not significantly suppress the ammonia trapping property of the ammonia trapping non-woven fabric. To ensure a sufficient affinity for electrolytes, the fiber in the reinforcing non-woven fabric should have a total sulfur content of preferably 0.1 mg or more, and more preferably 0.5 mg or more per 1 g of the fiber.

As the reinforcing non-woven fabric, a non-woven fabric made of a poly(vinyl alcohol) or an ethylene-vinyl alcohol copolymer can be employed. The non-woven fabric of this type has no ammonia trapping property but has a high strength and a satisfactory affinity for electrolytes.

In the invented battery separators according to the first and second aspects, the main component fiber in the ammonia trapping non-woven fabric preferably has a total sulfur content of more than 10 mg and equal to or less than 50 mg per 1 g of the fiber. For example, in a preferred battery separator comprising a plurality of laminated sheets, one sheet is an ammonia trapping non-woven fabric and another sheet is a reinforcing non-woven fabric, the ammonia trapping non-fabric mainly contains a fiber obtained by sulfonating a polyolefin resin fiber having an intrinsic viscosity number of 0.2 to 1.0 dl/g and the resulting sulfonated fiber has a total sulfur content of more than 10 mg and equal to or less than 50 mg per 1 g of the fiber, and the reinforcing non-woven fabric mainly contains a polyolefin resin fiber having a total sulfur content of 7 mg or less and more than 0 mg per 1 g of the fiber. The separator includes each at least one ply of the ammonia trapping non-woven fabric and the reinforcing non-woven fabric laminated therein. When the main component fiber in the ammonia trapping non-woven fabric has a total sulfur content of more than 10 mg/g and equal to or less than 50 mg/g, the resulting ammonia trapping non-woven fabric has a satisfactory ammonia trapping property, as described above.

The ammonia trapping non-woven fabric in the invented battery separators according to the first and second aspects preferably contains 20% by mass or more of the sulfonated fiber relative to the total mass of the battery separator.

A separator containing 20% by mass or more of the sulfonated fiber allows the resulting battery using the separator to satisfactorily trap ammonia to thereby reduce the self-discharge and increase the capacity-holding rate.

The total sulfur content is indicated in terms of a content per 1 g of the fiber as above. Alternatively, the ammonia trapping non-woven fabric preferably has a total sulfur content of 150 mg or more per 1 m$^2$ of the area of the non-woven fabric.

Such an ammonia trapping non-woven fabric having a total sulfur content of 150 mg/m$^2$ or more, and more preferably 160 mg/m² or more, has sufficient amounts of sulfonic groups that are effective for ammonia trapping and exhibits a very. satisfactory ammonia trapping property. In contrast, if the non-woven fabric has excessively large amounts of sulfonic groups, i.e., an excessively large total sulfur content, the constitutive fiber may be deteriorated in strength. Accordingly, the ammonia trapping non-woven fabric should preferably have a total sulfur content of 500 mg/m² or less.

In the invented battery separators according to the first and second aspects, the ammonia trapping non-woven fabric preferably has a bulk density of equal to or more than 0.5 g/cm³, and the reinforcing non-woven fabric preferably has a bulk density of equal to or more than 0.4 g/cm³.

When the ammonia trapping non-woven fabric has a bulk density of equal to or more than 0.5 g/cm³, and more preferably equal to or more than 0.6 g/cm³, the non-woven fabric can highly retain a liquid and can be in contact with ammonia in an electrolyte more frequently to thereby trap the ammonia more effectively. The non-woven fabric having a high bulk density can serve to sufficiently separate the positive and negative electrodes from each other. In other words, the resulting separator can suppress active materials in one of the positive and negative electrodes from flowing into the other and can effectively suppress a short-circuit in the battery.

In contrast, the separator requires to have an oxygen gas permeability, which oxygen gas is formed at a terminal stage of charging of the battery. A separator having an extremely high bulk density should naturally have a low gas permeability. Accordingly, the ammonia trapping non-woven fabric preferably has a bulk density of equal to or less than 0.85 g/cm³. The ammonia trapping non-woven fabric having a bulk density within the above range allows the resulting separator to act satisfactory without deteriorating the gas permeability.

The ammonia trapping non-woven fabric should have a relatively high bulk density from the viewpoint of an efficiency in ammonia trapping, as described above. In contrast, the reinforcing non-woven fabric can have a lower bulk density and may have a bulk density of preferably 0.4 g/cm³ or less and more preferably 0.35 g/cm³ or less. Such a reinforcing non-woven fabric has a very high gas permeability and allows the ammonia in the electrolyte to readily permeate the reinforcing non-woven fabric and migrate into the ammonia trapping non-woven fabric.

From the viewpoint of reinforcing the ammonia trapping non-woven fabric, the reinforcing non-woven fabric should preferably have a bulk density of 0.15 g/cm³ or more.

By configuring the ammonia trapping non-woven fabric having a high total sulfur content to be of a high density and the reinforcing non-woven fabric for reinforcement to be of a low density, the ammonia trapping efficiency can be increased.

In terms of a METSUKE weight (note that a single unit for MITSUKE corresponds to 4.3560 grams/m² in accordance with JIS but in this specification, this unit is used to only mean grams/m²) the ammonia trapping non-woven fabric preferably has a METSUKE weight of 10 g or more per 1 m² of an apparent area of the separator. Such an ammonia trapping non-woven fabric having a METSUKE weight of 10 gm² or more can more satisfactorily serve to trap the ammonia. The METSUKE weight of the reinforcing non-woven fabric is determined by strengths which the separator requires, and is preferably 5 g/m² or more in order to be firmly integrated with the ammonia trapping non-woven fabric.

The constitutive fibers of the ammonia trapping non-woven fabric for use in the invented battery separators according to the first and second aspects preferably have an average fiber diameter of 10 µm or less.

When the constitutive fibers of the ammonia trapping non-woven fabric have an average fiber diameter of 10 µm (corresponding to 0.41 denier (0.451 decitex) in the case of a polypropylene fiber), the resulting ammonia trapping non-woven fabric can highly hold a liquid. In addition, the ammonia trapping non-woven fabric has large amounts of micropores and therefore has a sufficiently large fiber surface area to thereby satisfactorily trap the ammonia on the fiber surface. The average fiber diameter of the constitutive fibers is more preferably 9 µm or less and particularly preferably 8 µm or less.

In this connection, when the conventional ultrafine fiber made of a polyolefin resin is sulfonated, the sulfonated fiber has a markedly lower strength than that of a fiber having a large fiber diameter, and the resulting fiber may break to form pinholes. A battery including this type of separator may invite a short-circuit. However, the invented battery separator using the polyolefin resin fiber having an intrinsic viscosity number of 0.2 to 1.0 dl/g can avoid an extremely deteriorated strength and can therefore avoid the formation of pinholes due to the breakage of the constitutive fibers.

The constitutive fibers of the ammonia trapping non-woven fabric for use in the invented battery separators according to the first and second aspects preferably have an average fiber diameter of 1 µm or more.

Such constitutive fibers having an average fiber diameter of 1 µm or more can easily retain the uniformity of the non-woven fabric, can reduce the formation of pinholes and thereby can effectively suppress the occurrence of a short-circuit in the resulting battery. The constitutive fibers of this type ensure fine voids between the fibers that allow a gas to permeate and can retain a high permeability to a gas formed at a terminal stage of charging. The ammonia trapping non-woven fabric preferably has a gas permeability of 7 cm³/cm²/s or more as determined according to the method A for gas permeability prescribed in Japanese Industrial Standards (JIS) L1096 with a Frazier type Permeameter.

The constitutive fibers of the ammonia trapping non-woven fabric should have an average fiber diameter of more preferably 2 µm or more and particularly preferably 3 µm [corresponding to 0.057 denier (0.0627 decitex) in the case of a polypropylene fiber] or more and typically preferably 4 µm [corresponding to 0.102 denier (0.1122 decitex in the case of a polypropylene fiber] or more.

An ammonia trapping non-woven fabric comprising such fine fibers and having a high bulk density can highly efficiently be in contact with the ammonia, and the resulting battery using the ammonia trapping non-woven fabric can sufficiently suppress the self-discharge and have a high capacity-holding rate.

The constitutive fibers having an average fiber diameter within the above-specified range can ensure a satisfactory gas permeability and a sufficient suppression of permeation or migration of active materials in the electrodes.

In the invented battery separators according to the first and second aspect, the constitutive fibers of the reinforcing non-woven fabric preferably have an average fiber diameter of 10 µm or more.

Such relatively thick constitutive fibers of the reinforcing non-woven fabric having an average fiber diameter of 10 µm [corresponding to 0.64 denier (0.704 decitex) in the case of a polypropylene fiber] or more exhibit a sufficient reinforcing effect. When the reinforcing non-woven fabric comprises fibers satisfying both the above requirements in the intrinsic viscosity number and fiber diameter, the resulting reinforcing non-woven fabric is to be a layer retaining the strength and having a very high strength. This type of reinforcing non-woven fabric retains a sufficient strength even when the ammonia trapping non-woven fabric and the reinforcing non-woven fabric are sulfonated concurrently under the same conditions and the ammonia trapping non-woven fabric is sufficiently sulfonated. Thus, both the ammonia trapping and reinforcing non-woven fabrics can be easily sulfonated concurrently.

The constitutive fibers of the reinforcing non-woven fabric has an average fiber diameter of more preferably 12 $\mu$m or more, and particularly preferably 15 $\mu$m or more. In contrast, an extremely large fiber diameter will result in an uneven non-woven fabric, and the average fiber diameter is preferably 50 $\mu$m or less. and more preferably 40 $\mu$m or less.

The constitutive fibers of the reinforcing non-woven fabric for use in the battery separators according to the first and second aspects should preferably have a rectangular or elliptic cross section.

As is stated above, a battery separator requires some gas permeability, but it is impossible to make the reinforcing non-woven fabric highly rough from the viewpoint of reinforcing the ammonia trapping non-woven fabric. When fibers having an identical fineness are compared from this viewpoint, a non-woven fabric comprising a fiber having a rectangular or elliptic cross section is more bulky and has a higher gas permeability than a non-woven fabric comprising a fiber having a round cross section. This bulky non-woven fabric allows the ammonia in the electrolyte to satisfactorily migrate to, and come in contact with the ammonia trapping non-woven fabric.

In addition, the fibers in the reinforcing non-woven fabric having a rectangular or elliptic cross section can be effectively entangled with fibers constituting the ammonia trapping non-woven fabric when the reinforcing non-woven fabric is laminated onto the ammonia trapping non-woven fabric, and the resulting laminate comprises the firmly bonded ammonia trapping non-woven fabric and reinforcing non-woven fabric and has a high reliability.

To exhibit an effective ammonia trapping property, the invented battery separators according to the first and second aspects should preferably have a total sulfur content of equal to or more than 1 mg, more preferably equal to or more than 1.5 mg and particularly preferably equal to or more than 2 mg per 1 g of the battery separator.

The ammonia trapping property can be controlled by changing a degree of sulfonation. This is probably because an interaction between the cross-linking structure and ammonia increases and thus the capacity factor of the micropores increases with an increasing amount of sulfur constituting the cross-linking structure. The total amounts of the micropores do not increase sharply with an increasing degree of the cross-linking.

The present inventors made further investigations on the relationship between the states of sulfonic groups on fibers and the ammonia trapping property and found that an oxidation treatment as stated above prior to the sulfonation can yield a fiber constituting a separator that can retain a satisfactory ammonia trapping property even at high temperatures. The following third and fourth aspects of the invention have been accomplished based on the above findings.

Specifically, the invented battery separator according to the third aspect comprises a polyolefin resin fiber having sulfonic groups substantially uniformly introduced on the fiber surface and has an ammonia trapping rate of 80% or more. Alternatively, the invented battery separator according to the third aspect comprises a fiber obtained by oxidizing a surface of a polyolefin fiber and sulfonating the oxidized fiber and has an ammonia trapping rate of 80% or more. The ammonia trapping rate can be determined in accordance with an ammonia trapping test as stated later.

The oxidation treatment of a polyolefin resin fiber as a pretreatment prior to the sulfonation treatment allows a large total amount of sulfonic groups to be introduced uniformly on the fiber surface. The resulting separator is therefore to have a high ammonia trapping rate.

A separator having an ammonia trapping rate of 80% or more can highly reduce the ammonia in electrolytes to thereby reduce the self-discharge. In this connection, the invented separator can achieve an ammonia trapping rate of 80% or more even if the ammonia trapping rate is determined according to a method of measuring the ammonia trapping rate of a sample after a storage at 60° C. for 72 hours (hereinafter referred to as "the test method 2 for ammonia trapping"). This indicates that the invented battery separator can thermally stably retain the ammonia trapping property.

The separator should more preferably have an ammonia trapping rate of 85% or more.

The separator may be composed of a non-woven fabric uniformly containing the aforementioned polyolefin resin fiber in which sulfonic groups are introduced substantially uniformly onto the fiber surface or may be a laminated separator comprising at least one ply of an ammonia trapping non-woven fabric mainly containing the fiber and at least one ply of a reinforcing non-woven fabric other than the ammonia trapping non-woven fabric.

The invented battery separator according to the third aspect preferably has a battery capacity-holding rate of 60% or more.

The invented process for producing a battery separator according to the fourth aspect comprises the steps of oxidizing a surface of a polyolefin resin fiber to form sites where the fiber surface can be easily sulfonated, and sulfonating the oxidized fiber.

The operation of this configuration is supposed as follows. The collapse of sulfonated portions of a highly sulfonated polyolefin fiber is caused by uneven sulfonation of the fiber, as described above. However, the oxidation treatment prior to the sulfonation treatment yields sites where the fiber can be readily sulfonated, and the subsequent sulfonation allows sulfonic groups to be introduced uniformly on the surface rather than the inside of the fiber. By this, the total amount of the introduced sulfonic groups is increased to thereby enhance the ammonia trapping property.

Sites for trapping ammonia include, for example, sulfonic groups and halogen compounds (including fluorine, chlorine, and bromine). The sulfonic group is advantageously employed in the sulfonation in the invented process for its high thermal stability.

Processes for the oxidation treatment are not limited as far as they can oxidize the fiber surface uniformly, and either of a gas phase process or a liquid phase process can be employed.

Such a liquid phase process includes, for example, a process of subjecting the fiber to a liquid phase oxidation with nitric acid, a chromic acid mixture, or other mineral acids. The gas phase process includes, but is not limited to, a process of subjecting the fiber to a gas phase oxidation with oxygen, ozone, carbon dioxide, or other oxidizing gases. Gas phase processes can be advantageously employed in the present invention, of which typically preferred is a process which comprises activating an oxidizing gas with, for example, an electromagnetic wave, or an ultraviolet ray and making the activated oxidizing gas in contact with a polyolefin fiber (a non-woven fabric) to oxidize the fiber. Plasma of, for example, oxygen can be also employed. In this technique, oxidation can be performed over a very short time although the technique must be performed under reduced pressures.

Alternatively, the oxidation can be conduced by a process using an ultraviolet ray. In this process, a low pressure or high pressure mercury lamp, a halogen lamp, and other irradiators can be used. In the process of irradiating an ultraviolet ray, radical sites are formed and activated on constitutive fibers of the non-woven fabric, and concurrently an ozone gas having a high oxidizing property is formed to effectively oxidize the fibers. To allow the formed ozone gas to come in contact with the non-woven fabric effectively, the oxidation must be performed in a reactor housing or covering the overall non-woven fabric and ultraviolet lamp.

Of these processes for oxidation, processes using corona discharge or ultraviolet ray irradiation are typically preferred.

The oxidation for use in the third and fourth aspects of the invention can be performed within a wide degree of, for example, an O/C ratio (%) of from 0.05% to 40%. The degree of oxidation can be determined according to x-ray photoelectron spectroscopy (XPS or ESCA) and can be optimized by controlling an O/C ratio, i.e., a molar ratio of oxygen atoms to carbon atoms. In the examples stated below, the degree of oxidation was determined with an electron spectroscope for chemical analysis, Type ESCA 750 and was analyzed with an analyzer, Type ESCAPAC 760, both produced by Shimadzu Corporation, Japan. The O/C ratio (%) should more preferably fall in a range from 0.1% to 20%.

The polyolefin resin fiber for use in the invented battery separators according to the third and fourth aspects preferably has a fiber diameter of from 0.5 to 50 $\mu$m, and more preferably from 2 to 25 $\mu$m. A fiber having a fiber diameter exceeding 50 $\mu$m reduces an area of an outer surface of the fiber per unit weight and reduces the sulfonic groups on the fiber surface. In contrast, a fiber having a fiber diameter of less than 0.5 $\mu$m invites a gas permeability, which the battery separator must possess, to be insufficient and will cause problems or defects when a gas is formed at a terminal stage of charging.

The invented alkaline battery according to the fifth aspect utilizes the invented battery separator to separate a positive electrode from a negative electrode.

The invented battery separator has a satisfactory ammonia trapping property, can reduce the self-discharge and have a high capacity-holding rate when the battery is integrated into an alkaline battery. Such alkaline batteries include, but are not limited to, a nickel metal hydride secondary battery and a nickel-cadmium secondary battery (Ni—Cd battery).

Polyolefin resin fibers for use in the invented battery separators include, but are not limited to, fibers made of polyethylene, polypropylene, polybutene, polystyrene, ethylene-propylene copolymers, and other hydrocarbon resins. Of these resins, the polypropylene can be advantageously employed for smoothly and rapidly performing the sulfonation. Such polypropylene can be treated at a wide range of temperatures of from 90° C. to 150° C., in particular at high temperatures of 120° C. to 150° C. in a treatment with sulfuric acid stated below.

In particular, material resins of fibers for use in the invented battery separators according to the third and fourth aspect are preferably resins having an MFR in a range from 20 to 1000 g/10 min as determined according to a method described in JIS K7210. Of these resins, polyethylene resins, polypropylene resins are more preferred, and polypropylene resins are typically preferred among them.

Processes for the sulfonation for use in the invention include, but are not limited to, a process of treating the fiber in a gas phase with, for example, $SO_3$ gas or $SO_2$ gas, and a process of treating the fiber in a liquid phase with, for example, a sulfur acid solution or a fuming sulfuric acid.

Of these processes, the process of treating the fiber in a liquid phase with a sulfuric acid solution can efficiently form micropores and can uniformly sulfonate the fiber and is most preferred. The sulfonation is performed by immersing the fiber in a concentrated sulfuric acid at a temperature of preferably from 90° C. to 150° C. to introduce sulfonic groups into the fiber. The sulfonation is more preferably performed at high temperatures ranging from 120° C. to 150° C. to most efficiently introduce sulfonic groups and to thereby most efficiently increase the total sulfur content of the fiber.

When the sulfonation is performed after an oxidation treatment as in the third and fourth aspects, a concentrated sulfuric acid is used at temperatures ranging preferably from 85° C. to 130° C. and more preferably from 90° C. to 120° C. According to a sulfonation under harsh conditions at temperatures exceeding 130° C., sites having a high ammonia trapping activity, which distinguish the third and fourth aspects of the invention, cannot be significantly formed. In contrast, if the sulfonation is performed at temperatures less than 85° C., the sulfonation proceeds at a low rate thereby lowering a productivity.

Alternatively, the process of treating the fiber in a gas phase with $SO_3$ gas can efficiently form micropores and is also preferred. The process of treating the fiber in a gas phase with $SO_3$ gas may be performed with 0.5 to 30% by volume, and optimally 2 to 20% by volume, of $SO_3$ gas at temperatures ranging from 15° C. to 40° C. (e.g., at room temperature).

According to a sulfonation treatment under harsh conditions at an $SO_2$ gas concentration exceeding 30% by volume, trapping sites having a high ammonia trapping activity which distinguishes the invention cannot be significantly formed.

The invented battery separator may be obtained by preparing a sheet made of a non-woven fabric containing, for example, 20% by mass or more of the above-prepared polyolefin resin fiber containing large amounts of sulfonic groups.

Alternatively, the separator may be obtained by preparing an ammonia trapping non-woven fabric (hereinafter referred to as "layer A") mainly containing the above-prepared polyolefin resin fiber comprising large amounts of sulfonic groups, and laminating the layer A onto a reinforcing non-woven fabric (hereinafter referred to as "layer B"). Such a separator comprising a laminate of the layer A and the layer B can be obtained by a technique of independently sulfonating the layer A and the layer B and laminating the sulfonated layers, or by a technique of laminating the layer A and the layer B prior to sulfonation and sulfonating the laminated layers.

The latter technique can be performed in the following manner. Using, for example, a polyolefin resin fiber having an intrinsic viscosity number of 0.2 to 1.0 dl/g to constitute the layer A and a polyolefin resin fiber having an intrinsic viscosity number of more than 1.0 dl/g to constitute the layer B, the layers A and B are concurrently sulfonated. As the layer B is more resistant against sulfonation than the layer B, the layer B is less sulfonated than the layer A. The use of such material layers having different resistance against sulfonation can yield a layer A having a total sulfur content of the polyolefin resin fiber of more than 10 mg/g and equal to and less than 50 mg/g and a layer B having a total sulfur content of the polyolefin resin fiber of equal to or less than 7 mg/g, through one sulfonation procedure. The layer B just mentioned above is weakly sulfonated to some extent and therefore has a sufficient fiber strength yet has a satisfactory wettability.

By laminating the layer A having a satisfactory ammonia trapping property and the layer B having a high strength, a battery separator having both the desirable properties can be obtained.

Processes for laminating the layers A and B include, but are not limited to, a process of entangling constitutive fibers of the layers A and B with each other by action of, for example, a water stream or an air flow to integrate the layers A and B as a laminate, and a process of thermally fusion-bonding the layers A and B to integrate the both layers as a laminate.

Alternatively, the lamination can be performed by a technique of preparing a non-woven fabric as the layer B and laminating a fiber for constituting the layer A on the prepared layer B immediately after melt-spinning of the fiber and integrating both the layers by solidification of the fiber of the layer A, or a technique of preparing a non-woven fabric as the layer A and laminating a fiber for constituting the layer B on the prepared layer A immediately after melt-spinning of the fiber to solidify the fiber to thereby integrate the layers A and B. The latter technique is more preferred as the resulting layer B can have a more retained strength. The layers A and B are preferably integrated with each other through solidification of a fiber immediately after melt-spinning in the above manner, as the resulting laminate is completely integrated and cannot be significantly separated.

The laminated separator has only to comprise each at least one ply of the layer A and the layer B, and two or more plies of each layer can be laminated.

In the laminated layers A and B, the polyolefin resin fiber of the layer A should be preferably distributed uniformly in a direction of a plane of the separator. Such a homogenous distribution of the polyolefin resin fiber can completely trap the ammonia passing through the separator by action of diffusion.

Polyolefin resin fibers for use in the layers A and B include, but are not limited to, continuous fibers, discontinuous fibers, long staples, and short staples. Fibers fabricated by a spun-bonding process, those obtained by splitting a film, as well as those produced by a melt-blowing process can be advantageously employed. In addition, side-by-side fibers, sheath-core fibers, and other composite fibers made of, for example, polyethylene and polypropylene can be employed. In this case, the strength of the fiber can be satisfactorily retained by melt-bonding the polyethylene component. An incorporation of an ultrahigh molecular weight polyethylene having an elongation percentage of from 2% to 10% into the material fiber is effective to increase the strength of the fiber to thereby yield a more satisfactory reinforcing activity.

A non-woven fabrics for constituting the layer A or the layer B may be a composite non-woven fabric using a fiber having a large fiber diameter and a fiber having a small fiber diameter, or may be a non-woven fabric comprising a fiber of an identical fiber diameter.

The invention will be further illustrated in detail with reference to several inventive examples and comparative examples below which are not intended to limit the scope of the invention.

In the following examples and comparative examples, the properties of the separator, i.e., intrinsic viscosity, total sulfur content, amount of sulfonic groups, specific surface area, bulk density, strength, amount of functional groups, ammonia trapping rate, and the capacity-holding rate of the battery were respectively determined in accordance with the following methods.

1. Intrinsic Viscosity Number (IV)

A sample was dissolved in a solvent, tetralin, and the resulting solution was filtered with a glass filter and the viscosity of the filtrate was determined with a Ubelohde viscometer at a temperature of 135±0.1° C. To the tetralin for use in determination, a 0.2% by mass 2,4-di-t-butyl-4-hydroxytoluene (BHT) was added in advance to suppress oxidation degradation of the sample during dissolution. The solution contained the sample in a concentration of 1 g/1000 cc. The Huggins constant (k') was set at 0.35. The aforementioned method of determining an intrinsic viscosity number was in accordance with a method described in "Lectures on Experimental Chemistry, Vol. 8, Polymer Chemistry Book 1, Chapter 5, Viscosity, The Chemical Society of Japan, May 15, 1963".

2. Total Sulfur Content

The total sulfur content of a sample was determined in the following manner by an in-flask burning method in accordance with a method described in "Lectures on Basic Analytical Chemistry, Vol. 11, The Japan Society for Analytical Chemistry (Kyoritsu Shuppan), pp. 34–43, September 1965".

A dilute hydrogen peroxide aqueous solution was placed in a 300-ml Erlenmeyer flask, and the inside atmosphere of the Erlenmeyer flask was replaced with oxygen. A sample was wrapped with a filter paper and was inserted into a platinum supporting net mounted on a grinding stopper for an Erlenmeyer flask. The wrapped sample was then ignited and the stopper was inserted into the Erlenmeyer flask. The sample with the filter paper was burnt and decomposed at high temperatures and constitutive sulfur was converted into $SO_2$ and/or $SO_3$. The $SO_2$ and/or $SO_3$ were then oxidized with the hydrogen peroxide aqueous solution and were converted into sulfuric acid. The amount of the formed sulfuric acid in the aqueous solution containing sulfuric acid was determined in a state close to a methanol nonaqueous solution by titration with barium perchlorate using thorin as an indicator, and was converted into a sulfur content.

3. Amount of Sulfonic Groups (Amount of Functional Groups)

A sample separator was immersed in a 1/10 normal potassium hydroxide (KOH) solution, and air bubbles in the separator were eliminated by vacuum deaeration to allow the separator to come in complete contact with the KOH solution. The amount of KOH consumed by neutralization was then determined by titration with a hydrochloric acid normal solution. The amount of sulfonic groups (functional groups per 1 gram) in the separator was thus determined based on an ion exchange capacity of potassium ions. A phenolphthalein indicator was used for identifying a point of neutralization.

4. Specific Surface Area

An adsorption isotherm of a nitrogen gas at a liquid nitrogen temperature was determined using a Sorptomatic instrument (a product of Carlo Erba Co., Ltd.). The adsorption of a monomolecular layer of the nitrogen gas was estimated according to the Brunauer-Emmett-Teller equation (BET method) using data in a range of a relative pressure ($P/P_0$) of from 0.1 to 0.35 to determine a specific surface area.

A model (a cylindrical pore model) assuming that its pore would be cylindrical was then estimated using data of the specific surface are and data of the overall pore volume obtained in the determination of the adsorption isotherm. The diameter of the assumed cylinder was defined as an average pore size. The method for determining a specific surface area according to the BET method is described in detail by Keii Tominaga in "Adsorption", Kyoritsu Shuppan, 1965.

In this connection, a specific surface area indicates the quantity of micropores.

5. Bulk Density

The layers A and B of a sample separator were carefully separated from each other and were sufficiently washed to remove attached impurities. The washed layers were dried with a hot air at 60° C. for 2 hours and then were dried in vacuo at 60° C. for 20 hours to attain a constant weight. The METSUKE weights of the both layers were determined on the basis of constant weights of the layers. The thickness of each of the layers A and B was determined by a scanning electron microscopic (SEM) observation of a cross section of a sample integrated separator before separation of the layers A and B. The bulk density (g/cm³) was then calculated according to the following equation (1).

Bulk Density=METSUKE weight per 1 cm² (g/cm²)/thickness of layer(cm)  (1)

When the layer A could not be significantly separated from the layer B, the weight basis was determined in the following manner. A sample separator comprising integrated layers A and B was washed to eliminate attached impurities in the same manner as above, and was dried with a hot air at 60° C. for 2 hours and was then dried in vacuo at 60° C. for 20 hours to attain a constant weight. This constant weight was used as the weight basis. Of a cross section of the sample separator, 30 points were randomly selected as points of measurement, and images of portions where the layer A and the layer B were independently present in the points of measurement were analyzed to determine occupied volumes of constitutive fibers. The bulk density was then determined based on the above-determined occupied volumes and true specific gravities of the constitutive resins.

6. Strength

Test specimens, each having a width of 5 cm and a length of 15 cm, were taken from a separator to be tested. The full width of the end portions, of 10 cm lengths, of the specimen was gripped and the specimen was stretched at a rate of 30 cm/min in accordance with a test method for tensile strength of a woven fabric described in JIS L1068, until the specimen was broken. The strength of the separator was defined as the measured tensile strength of the specimen in a machine direction (MD). The tensile strength was measured using a TENSILON RTM-100 testing machine (a product of ORIENTEC Co., Japan).

7. Ammonia Trapping Rate [Test Method 1 for Ammonia Trapping]

In an eggplant type flask, 1000 cc of a 8 N potassium hydroxide solution and 1.0 g in dry weight of a separator to be tested were placed, and the air inside the separator was removed by vacuum deaeration to allow the separator to come in complete contact with the potassium hydroxide solution. After the vacuum deaeration was released, 0.1 cc of a 1 N ammonia aqueous solution was put into the flask to adjust the concentration of ammonia to $3\times10^{-4}$ M. The flask was then hermetically sealed and was allowed to stand at 45° C. for 72 hours. The amount of residual ammonia was then measured and the amount of ammonia trapped by the separator was calculated from the amount of residual ammonia based on a calibration curve. The ammonia trapping rate was indicated by the following equation. Ammonia trapping rate (%)=[amount of trapped ammonia/initial amount of ammonia]×100. When the ammonia trapping rate was indicated by an amount of trapped ammonia, it was indicated in mmol per 1 g of the separator to be tested. The concentration of ammonia was determined by absorption spectrophotometry in accordance with a method described in JIS K0102.42.2.

When the separator to be tested had already trapped ammonia, the ammonia trapping rate was determined in the following manner. Initially, the separator to be tested was washed with pure water as a pretreatment and was immersed in a 1 N hydrochloric acid solution 200 times by weight that of the separator for 10 hours or more. The immersed separator was washed again with pure water and was dried in vacuo at 60° C. at a reduced pressure of 2 Pa for 20 hours to regenerate the separator. The amount of ammonia of the regenerated separator was measured in the same manner as above to determine an ammonia trapping rate.

8. Ammonia Trapping Rate [Test Method 2 for Ammonia Trapping]

A separator to be tested was completely immersed in a potassium hydroxide solution in the same manner as above. After the vacuum deaeration was released, 0.1 cc of a 1 N ammonia aqueous solution was put into the flask to adjust the concentration of ammonia to $1\times10^{-4}$ M. The flask was then hermetically sealed and was allowed to stand at 60° C. for 72 hours. The amount of residual ammonia was then determined in the same manner as the above Test Method 1 in accordance with a method described in JIS K0102.42.2, and the amount of ammonia trapped by the separator was calculated from the amount of residual ammonia based on a calibration curve.

When the separator to be tested had already trapped ammonia, the ammonia trapping rate was determined in the following manner. Initially, the separator to be tested was washed with pure water as a pretreatment and was immersed in a 1 N hydrochloric acid solution 200 times by weight that of the separator for 10 hours or more. The immersed separator was washed again with pure water and was dried to regenerate the separator in the same manner as above. The amount of ammonia of the regenerated separator was measured in the same manner as above to determine an ammonia trapping rate.

9. Capacity-Holding Rate [Test Method 1 for Capacity-Holding Rate]

Initially, a nickel hydroxide paste for a positive electrode, a hydrogen-storing alloy paste for a negative electrode, and a separator to be tested were spirally wound to yield an enclosed battery of an SC size. A potassium hydroxide aqueous solution added with lithium hydroxide was used as an electrolyte of the above-prepared battery.

As an initial activation preliminary treatment, the above-prepared battery was allowed to stand at 45° C. for 6 hours. The battery was then charged at 0.2 C for 6 hours and was discharged at 0.2 C at 20° C. in an air atmosphere to attain a final voltage of 1.0 V. A couple of the charging and discharging procedures was repeated seven times.

Next, the battery was charged at 0.2 C for 6 hours, was allowed to stand still for 1 hour, and was discharged at 0.2 C to attain a final voltage of 1.0 V. A service capacity after this procedure was measured (measurement $C_0$). The battery was then recharged at 0.2 C for 6 hours, was allowed to stand at 45° C. in an air atmosphere for 168 hours, was cooled at 20° C. for 6 hours, and was discharged at 0.2 C to attain a final voltage of 1.0 V. A service capacity after this procedure was measured (measurement $C_1$). The battery was then recharged at 0.2 C for 6 hours, was allowed to stand for 1 hour, and was discharged at 0.2 C to attain a final voltage of 1.0 V. A service capacity in this procedure was determined (measurement $C_2$). The aforementioned discharging procedure at 0.2 C was performed by discharging a full-recharged battery over 5 hours. The amount of current in this procedure was set to an appropriate amount.

The capacity-holding rate was calculated from the measurements in accordance with the following equation (2).

$$\text{Capacity-holding Rate } (\%) = [C_1 \times 2/(C_0 + C_2)] \times 100 \quad (2)$$

The relationship between the amount of self-discharge (%) and the capacity-holding rate (%) is indicated by the following equation (3).

$$\text{Capacity-holding Rate} = 100 - (\text{Amount of Self-discharge}) \quad (3)$$

10. Capacity-holding Rate [Test Method 2 for Capacity-holding Rate]

The test was performed in the same manner as in the test method 1 for capacity-holding rate, except that "the battery was allowed to stand at 60° C. in an air atmosphere for 72 hours" instead of "the battery was allowed to stand at 45° C. in an air atmosphere for 168 hours".

EXAMPLE 1

A material polypropylene resin for use in a layer A was converted into a fiber and concurrently into a non-woven fabric by a melt-blowing process. Specifically, polypropylene chips were melted in an extruder and were extruded from orifices at a head temperature of 220° C. at an extruding rate per orifice of 0.5 g/min. into a blowing stream of air at a temperature of 250° C. at a pressure of 0.6 kgf/cm$^2$ (5.9 N/cm$^2$). The resulting fine fibers were randomly accumulated on a screen conveyer to yield a non-woven fabric (the layer A). In this procedure, a commercially available polypropylene non-woven fabric (ELTAS P03030, a product of Asahi Chemical Industry Co., Ltd., Japan; a layer B) was placed on the screen conveyer in advance and thus the layer A was laminated onto the layer B. The laminated layers A and B were then integrated by hot pressing at a temperature of 100° C. The integrated laminate was immersed in a 95% concentrated sulfuric acid at 130° C. for 10 minutes for sulfonation to yield a separator.

The obtained separator was integrated into a battery and the capacity-holding rate of the resulting battery was determined. Properties of the separator and the capacity-holding rate of the battery are shown in Tables 1 and 2.

EXAMPLE 2

A material polypropylene resin for use in a layer B was converted into a fiber and concurrently into a non-woven fabric by a spun-bonding process. Specifically, polypropylene resin chips were melted at 240° C. and the molten resin was extruded from nozzles into an air jet and was drawn into fibers. The drawn fibers were randomly accumulated on a screen conveyer to yield a non-woven fabric as the layer B. Separately, another material polypropylene resin for use as a layer A was converted into fibers and concurrently into a non-woven fabric as the layer A by a melt-blowing process. The layers A and B were laminated in the same manner as in Example 1, and the resulting laminate was immersed in a 97% concentrated sulfuric acid at 120° C. for 10 minutes for sulfonation to yield a separator.

The above-prepared separator was integrated into a battery, and the capacity-holding rate of the battery was determined. Properties of the separator and the capacity-holding rate of the battery are shown in Tables 1 and 2.

EXAMPLE 3

A non-woven fabric obtained by a spun-bonding process as a layer B and a non-woven fabric obtained by a melt-blowing process as a layer A were laminated and integrated in the same manner as in Example 2. The laminated and integrated non-woven fabric was immersed in a 90% concentrated sulfuric acid at 125° C. for 20 minutes for sulfonation to yield a separator.

The above-prepared separator was integrated into a battery, and the capacity-holding rate of the battery was determined. Properties of the separator and the capacity-holding rate of the battery are shown in Tables 1 and 2.

EXAMPLE 4

A non-woven fabric obtained by a spun-bonding process as a layer B and a non-woven fabric obtained by a melt-blowing process as a layer A were laminated and integrated in the same manner as in Example 2. The laminated and integrated non-woven fabric was exposed to a nitrogen gas containing 1% by volume of an $SO_3$ gas at 25° C. for 120 minutes for sulfonation to yield a separator.

The above-prepared separator was integrated into a battery, and the capacity-holding rate of the battery was determined. Properties of the separator and the capacity-holding rate of the battery are shown in Tables 1 and 2.

EXAMPLE 5

Polypropylene resin chips were melted in an extruder and were extruded from orifices at a head temperature of 220° C. at an extruding rate per orifice of 0.5 g/min. into a blowing stream of air at a temperature of 250° C. at a pressure of 0.6 kgf/cm$^2$ (5.9 N/cm$^2$). Concurrently with the formation of fibers by melt-blowing, the resulting fine fibers were randomly accumulated on a screen conveyer to yield a non-woven fabric as a layer A. The obtained layer A was placed on a screen conveyer, and another ply of a non-woven fabric of a layer A was laminated onto the above-prepared layer A in the same manner as above to yield a two-layer laminated non-woven fabric. The laminated non-woven fabric was then sulfonated under the same condition as in Examples 1 and 2 to yield a separator.

The above-prepared separator was integrated into a battery, and the capacity-holding rate of the battery was determined. Properties of the separator and the capacity-holding rate of the battery are shown in Tables 1 and 2.

Comparative Example 1

Two plies of the same commercially available polypropylene non-woven fabric (ELTAS P03030, a product of Asahi Chemical Industry Co., Ltd., Japan) as in Example 1 were superimposed and the resulting laminate was integrated by hot pressing at 130° C. The integrated laminate was sulfonated under the same condition as in Example 1 to yield a separator.

The above-prepared separator was integrated into a battery, and the capacity-holding rate of the battery was determined. Properties of the separator and the capacity-holding rate of the battery are shown in Tables 1 and 2.

Comparative Example 2

A non-woven fabric was obtained by a spun-bonding process. Specifically, polypropylene resin chips were melted at 240° C. and the molten resin was extruded from nozzles into an air jet and was drawn into fibers. The drawn fibers were randomly accumulated on a screen conveyer to yield a non-woven fabric. The obtained non-woven fabric was sulfonated under the same condition as in Example 1 to yield a separator.

The above-prepared separator was integrated into a battery, and the capacity-holding rate of the battery was determined. Properties of the separator and the capacity-holding rate of the battery are shown in Tables 1 and 2.

TABLE 1

|  | Layer A | | | Layer B | | |
| --- | --- | --- | --- | --- | --- | --- |
|  | IV (dl/g) | Fiber Diameter ($\mu$m) | METSUKE (g/m$^2$) | IV (dl/g) | Fiber Diameter ($\mu$m) | METSUKE (g/m$^2$) |
| Example 1 | 0.57 | 4.5 | 25 | 1.08 | 17.9 | 30 |
| Example 2 | 0.95 | 9.0 | 38 | 1.69 | 18.0 | 20 |
| Example 3 | 0.78 | 7.8 | 40 | 1.69 | 20.5 | 30 |
| Example 4 | 0.49 | 9.8 | 41 | 1.15 | 18.0 | 20 |
| Example 5 | 0.57 | 4.5 | 50 | — | — | — |
| Comp. Ex. 1 | — | — | — | 1.08 | 17.9 | 60 |
| Comp. Ex. 2 | — | — | — | 1.60 | 12.3 | 61 |

EXAMPLE 6

As a layer B, a polypropylene non-woven fabric having an intrinsic viscosity number of 1.03 dl/g (PU5020, a product of Asahi Chemical Industry Co., Ltd., Japan) was used. Separately, polypropylene resin chips having an intrinsic viscosity number of 0.58 dl/g as a material of a layer A were melted in an extruder and were extruded from orifices at a head temperature of 220° C. at an extruding rate per orifice of 0.5 g/min. into a blowing stream of air at a temperature of 250° C. at a pressure of 0.6 kgf/cm$^2$ (5.9 N/cm$^2$). Concurrently with the formation of fibers by the melt-blowing process, the resulting fine fibers were randomly accumulated on a screen conveyer to yield a non-woven fabric as the layer A. In this procedure, the polypropylene non-woven fabric as the layer B was placed on the screen conveyer in advance and the layer A was thus laminated onto the layer B. The resulting laminate was integrated by hot pressing at 100° C. and was immersed in a 98% by mass concentrated sulfuric acid at 135° C. for 5 minutes for sulfonation to yield a separator. The layers A and B in the resulting separator had total sulfur contents of 15.8 mg/g and 2.8 mg/g, respectively. The separator was then integrated into a nickel metal hydride secondary battery.

EXAMPLE 7

A material polypropylene resin having an intrinsic viscosity number of 1.35 dl/g for use as a layer B was converted into a fiber and concurrently into a non-woven fabric by a spun-bonding process. Specifically, polypropylene resin chips were melted at 240° C. and were extruded from nozzles into an air jet and was drawn into fibers. The drawn fibers were randomly accumulated on a screen conveyer to yield a non-woven fabric as the layer B. Onto the above-prepared non-woven fabric of the layer B, another material polypropylene resin having an intrinsic viscosity number of 0.38 dl/g was converted into fibers and concurrently into a non-woven fabric as a layer A by a melt-blowing process in a manner similar to that in Example 6. The layers A and B were integrated by hot pressing at 100° C. The resulting

TABLE 2

|  | Specific Surface Area (m$^2$/g) | Average Pore Size (nm) | Total Sulfur Content (mg/g) | Ammonia Trapping Rate <Test Method 1> (mmol/g) | Ion Exchange Capacity (meq/g) | Capacity-holding Rate <Test Method 1> (%) | Tensile Strength (kgf/5 cm) |
| --- | --- | --- | --- | --- | --- | --- | --- |
| Example 1 | 4.2 | 1.7 | 12.0 | 0.287 | 0.035 | 81 | 8.1 |
| Example 2 | 3.0 | 1.6 | 9.6 | 0.270 | 0.030 | 79 | 7.2 |
| Example 3 | 2.7 | 1.7 | 5.8 | 0.230 | 0.030 | 76 | 12.5 |
| Example 4 | 3.0 | 1.8 | 2.6 | 0.195 | 0.100 | 65 | 8.1 |
| Example 5 | 8.0 | 1.7 | 16.8 | 0.290 | 0.051 | 80 | 2.0 |
| Comp. Ex. 1 | <0.1 | — | 0.8 | 0.088 | 0.055 | 33 | 17.5 |
| Comp. Ex. 2 | <0.1 | — | 0.7 | 0.044 | 0.039 | 25 | 19.8 |

These results show that the invented battery separator according to the first aspect has a satisfactory ammonia trapping property, and the invented battery comprising this battery separator according to the fifth aspect of the invention exhibits a reduced self-discharge. In addition, when the layer A of the separator is composed of ultrafine fibers to further improve particle- and ammonia-trapping properties and concurrently a reinforcing layer B is used in combination with the layer A, the resulting battery can achieve a satisfactory particle permeation and no fiber breakage, which cannot be concurrently achieved by conventional equivalents, and can reduce the probability of occurrence of a short-circuit and have an increased reliability.

laminate was immersed in a 98% by mass concentrated sulfuric acid at 130° C. for 10 minutes for sulfonation to yield a separator. The layers A and B in the resulting separator had total sulfur contents of 18.9 mg/g and 3.5 mg/g, respectively. The separator was then integrated into a nickel metal hydride secondary battery.

EXAMPLE 8

A polypropylene film 5 $\mu$m thick was cut into fibers 40 $\mu$m wide. The resulting fibers had an intrinsic viscosity number of 1.38 dl/g and had a rectangular cross section. The fibers were converted into a non-woven fabric as a layer B. The non-woven fabric of the layer B was placed on a screen conveyer, and onto the layer B, a material polypropylene resin having an intrinsic viscosity number of 0.78 dl/g was converted into fibers and was concurrently accumulated to yield a non-woven fabric as a layer A by a melt-blowing process in the same manner as in Example 6. The resulting laminate was immersed in a 95% by mass concentrated sulfuric acid at 130° C. for 10 minutes for sulfonation to yield a separator. The layers A and B in the resulting separator had total sulfur contents of 10.1 mg/g and 2.9 mg/g, respectively. The separator was then integrated into a nickel metal hydride secondary battery.

EXAMPLE 9

An integrated non-woven fabric comprising a layer A and a layer B was prepared in the same manner as in Example 7, except that a polypropylene resin having an intrinsic viscosity number of 1.22 dl/g as a layer B and a polypropylene resin having an intrinsic viscosity number of 0.58 dl/g as a layer A were respectively used as materials. The resulting non-woven fabric was exposed to a nitrogen gas containing 1% by volume of an $SO_3$ gas at 25° C. for 120 minutes for sulfonation to yield a separator. The layers A and B in the resulting separator had total sulfur contents of 8.9 mg/g and 2.2 mg/g, respectively. The separator was then integrated into a nickel metal hydride secondary battery.

Comparative Example 3

An integrated non-woven fabric comprising a layer A and a layer B was prepared in the same manner as in Example 7, except that a polypropylene resin having an intrinsic viscosity number of 1.35 dl/g as a layer B and a polypropylene resin having an intrinsic viscosity number of 1.22 dl/g as a layer A were respectively used as materials. The resulting non-woven fabric was immersed in a 98% by mass concentrated sulfuric acid at 135° C. for 5 minutes for sulfonation to yield a separator. The layers A and B in the resulting separator had total sulfur contents of 6 mg/g and 3.7 mg/g, respectively. The separator was then integrated into a nickel metal hydride secondary battery.

Comparative Example 4

A material polypropylene resin having an intrinsic viscosity number of 1.34 dl/g was converted into a fiber and concurrently into a non-woven fabric by a spun-bonding process. Specifically, the material polypropylene resin chips were melted at 240° C. and were extruded from nozzles into an air jet and was drawn into fibers. The drawn fibers were randomly accumulated on a screen conveyer to yield a non-woven fabric. The non-woven fabric was immersed in a 98% by mass concentrated sulfuric acid at 130° C. for 10 minutes for sulfonation to yield a separator. The separator had a total sulfur content of 3.2 mg/g. The separator was then integrated into a nickel metal hydride secondary battery.

Comparative Example 5

An integrated non-woven fabric comprising a layer A and a layer B was prepared in the same manner as in Example 7, except that a polypropylene resin having an intrinsic viscosity number of 1.38 dl/g as a layer B and a polypropylene resin having an intrinsic viscosity number of 1.15 dl/g as a layer A were respectively used as materials. The resulting non-woven fabric was immersed in a 98% by mass concentrated sulfuric acid at 130° C. for 30 minutes for sulfonation to yield a separator. The layers A and B in the resulting separator had total sulfur contents of 10.2 mg/g and 3.9 mg/g, respectively. The separator was then integrated into a nickel metal hydride secondary battery.

The properties of the separators according to Examples 6 to 9 and Comparative Examples 3 to 5 and the capacity-holding rate of each of the nickel metal hydride secondary batteries were determined. The results are shown in Tables 3 to 5.

TABLE 3

| | Layer A | | | | |
|---|---|---|---|---|---|
| | IV dl/g | Total Sulfur Content (mg/g) | Bulk Density (g/cm³) | Average Fiber Diameter (μm) | METSUKE (g/m²) |
| Example 6 | 0.58 | 15.8 | 0.71 | 6.0 | 20 |
| Example 7 | 0.38 | 18.9 | 0.73 | 3.2 | 20 |
| Example 8 | 0.78 | 10.1 | 0.77 | 4.8 | 30 |
| Example 9 | 0.58 | 8.9 | 0.69 | 5.6 | 20 |
| Comp. Ex. 3 | 1.22 | 6.0 | 0.7 | 5.5 | 20 |
| Comp. Ex. 4 | — | — | — | — | — |
| Comp. Ex. 5 | 1.15 | 10.2 | 0.47 | 9.8 | 5 |

IV: Intrinsic viscosity number

TABLE 4

| | Layer B | | | | |
|---|---|---|---|---|---|
| | IV dl/g | Total Sulfur Content (mg/g) | Bulk Density (g/cm³) | Average Fiber Diameter (μm) | METSUKE (g/m²) |
| Example 6 | 1.03 | 2.8 | 0.20 | 18 | 20 |
| Example 7 | 1.35 | 3.5 | 0.28 | 15 | 30 |
| Example 8 | 1.38 | 2.9 | 0.18 | 23 (rectangular) | 20 |
| Example 9 | 1.22 | 2.2 | 0.22 | 30 | 20 |
| Comp. Ex. 3 | 1.35 | 3.7 | 0.28 | 9.2 | 40 |
| Comp. Ex. 4 | 1.34 | 3.2 | 0.23 | 18 | 50 |
| Comp. Ex. 5 | 1.38 | 3.9 | 0.20 | 25 | 45 |

IV: Intrinsic viscosity number

TABLE 5

| | Separator | | | | | |
|---|---|---|---|---|---|---|
| | Total Sulfur Content of Layer A | Ammonia Trapping Rate <Test Method 1> | Strength | | Gas Permeability | Battery Capacity-holding Rate |
| | (mg/m²) | (%) | (N/5cm) | [(kgf /5cm)] | (cm³/cm²/s) | <Test Method 1> (%) |
| Example 6 | 316 | 85 | 100.0 | [10.2] | 10.0 | 72.8 |
| Example 7 | 378 | 90 | 80.4 | [8.2] | 8.3 | 72.9 |

TABLE 5-continued

| | Separator | | | | | |
|---|---|---|---|---|---|---|
| | Total Sulfur Content of Layer A | Ammonia Trapping Rate <Test Method 1> | Strength | | Gas Permeability | Battery Capacity-holding Rate |
| | (mg/m$^2$) | (%) | (N/5cm) | [(kgf /5cm)] | (cm$^3$/cm$^2$/s) | <Test Method 1> (%) |
| Example 8 | 404 | 95 | 96.0 | [9.8] | 8.2 | 73.2 |
| Example 9 | 178 | 80 | 87.2 | [8.9] | 9.8 | 68.3 |
| Comp. Ex. 3 | 120 | 20 | 41.2 | [4.2] | 5.0 | 54.2 |
| Comp. Ex. 4 | — | 8 | 149.0 | [15.2] | 22.1 | 35.0 |
| Comp. Ex. 5 | 33 | 15 | 31.4 | [3.2] | 12.5 | — |

Tables 3 to 5 show that the separators according to Examples 6 to 9 had a high ammonia trapping rate. This is probably because these separators had a high total sulfur content in the layer A, and the overall batteries using the separators had therefore a high total sulfur content. In addition, the batteries according to Examples 6 to 9 had a high capacity-holding rate.

In contrast, the separators according to Comparative Examples 3 and 4 had a low ammonia trapping rate and the batteries using these separators had a relatively low capacity-holding rate. The separator according to Comparative Example 5 had a relatively high ammonia trapping rate but a very low strength. Accordingly, a short-circuit occurred in the resulting battery and its capacity-holding rate could not be determined. This separator could not serve as a battery separator. The strength of the separator according to Comparative Example 5 was deteriorated probably because the separator was forced to be highly sulfonated.

As is described above, the invented battery separator according to the first aspect has a very high ammonia trapping property and has a less deteriorated fiber strength to thereby avoid breakage of fibers constituting the separator. The resulting battery using the separator hardly invites a short-circuit trouble and therefore has a high reliability and a long life. In addition, the invented battery according to the fifth aspect using this separator exhibits a minimized self-discharge and has a high capacity-holding rate. The laminated separator comprising a layer A having a high ammonia trapping property and a layer B serving as a reinforcing layer has a satisfactory strength as a separator and a high reliability. The resulting battery using the separator has a high capacity-holding rate.

EXAMPLE 10

A material polypropylene resin having an intrinsic viscosity number of 0.98 dl/g for use as a layer B was converted into a fiber and concurrently into a non-woven fabric by a melt-blowing process. Specifically, the polypropylene chips were melted in an extruder and were extruded from orifices at a head temperature of 200° C. at an extruding rate per orifice of 0.5 g/min. into a blowing stream of air at a temperature of 230° C. at a pressure of 0.4 kgf/cm$^2$ (3.9 N/cm$^2$). Concurrently with the formation of fibers, the fine fibers were randomly accumulated on a screen conveyer to yield a non-woven fabric. The obtained non-woven fabric was wound up to yield the layer B.

Separately, another material polypropylene resin having an intrinsic viscosity number of 0.58 dl/g for use as a layer A was converted into a fiber and concurrently into a non-woven fabric by a melt-blowing process. Specifically, the polypropylene chips were melted in an extruder and were extruded from orifices at a head temperature of 250° C. at an extruding rate per orifice of 0.5 g/min. into a blowing stream of air at a temperature of 250° C. at a pressure of 0.6 kgf/cm$^2$ (5.9 N/cm$^2$). Concurrently with the formation of fibers, the fine fibers were randomly accumulated on a screen conveyer to yield a non-woven fabric as the layer A. In this procedure, the above-prepared layer B was placed on the screen conveyer in advance and the layer A was thus laminated onto the layer B. The laminated layers A and B were then integrated by hot pressing at a temperature of 95° C. The integrated laminate was immersed in a 95% concentrated sulfuric acid at 130° C. for 10 minutes for sulfonation to yield a separator.

The obtained separator was integrated into a battery and the capacity-holding rate of the resulting battery was determined. Properties of the separator and the capacity-holding rate of the battery are shown in Tables 6 and 7.

EXAMPLE 11

A material polypropylene resin for use as a layer B was converted into fibers and concurrently into a non-woven fabric by a spun-bonding process. Specifically, the polypropylene resin was melted at 240° C., was extruded from nozzles into an air jet and was drawn into fibers. The drawn fibers were randomly accumulated on a screen conveyer to yield a non-woven fabric as the layer B. Separately, another material polypropylene resin was converted into fibers and concurrently into a non-woven fabric by a melt-blowing process to yield a non-woven fabric as a layer A. The layers A and B were then laminated and integrated with each other in the same manner as in Example 10. The integrated laminate was immersed in a 90% concentrated sulfuric acid at 120° C. for 10 minutes for sulfonation to yield a separator. The obtained separator was integrated into a battery and the capacity-holding rate of the resulting battery was determined. Properties of the separator and the capacity-holding rate of the battery are shown in Tables 6 and 7.

EXAMPLE 12

A non-woven fabric as a layer B and a non-woven fabric as a layer A were obtained by a spun-bonding process and by a melt-blowing process respectively, and were laminated and integrated with each other in the same manner as in Example 11. The integrated non-woven fabric was immersed in a 97% concentrated sulfuric acid at 95° C. for 240 minutes for sulfonation to yield a separator.

The obtained separator was integrated into a battery and the capacity-holding rate of the resulting battery was determined. Properties of the separator and the capacity-holding rate of the battery are shown in Tables 6 and 7.

EXAMPLE 13

Polypropylene resin chips having an intrinsic viscosity number of 0.58 dl/g were melted in an extruder and were extruded from orifices at a head temperature of 250° C. at an extruding rate per orifice of 0.5 g/min. into a blowing stream of air at a temperature of 250° C. at a pressure of 0.6 kgf/cm$^2$ (5.9 N/cm$^2$). Concurrently with the formation of fibers by melt-blowing, the resulting fine fibers were randomly accumulated on a screen conveyer to yield a non-woven fabric as a layer A The obtained non-woven fabric of layer A was placed on a screen conveyer. Onto this non-woven fabric, another ply of a non-woven fabric as a layer A was laminated in the same manner as above. Specifically, polypropylene resin chips having an intrinsic viscosity number of 0.58 dl/g were melted in an extruder and were extruded from orifices at a head temperature of 250° C. at an extruding rate per orifice of 0.5 g/min. into a blowing stream of air at a temperature of 250° C. at a pressure of 0.6 kgf/cm$^2$ (5.9 N/cm$^2$). Concurrently with the formation of fibers by melt-blowing, the resulting fine fibers were randomly accumulated on the above-prepared non-woven fabric on the screen conveyer to yield another layer A. The laminated non-woven fabric comprising two plies of the layer A was then immersed in a 95% concentrated sulfuric acid at 130° C. for 10 minutes for sulfonation to yield a separator.

The above-prepared separator was integrated into a battery, and the capacity-holding rate of the battery was determined. Properties of the separator and the capacity-holding rate of the battery are shown in Tables 6 and 7.

The above-prepared separator was integrated into a battery, and the capacity-holding rate of the battery was determined. Properties of the separator and the capacity-holding rate of the battery are shown in Tables 6 and 7.

TABLE 6

| | Layer A | | | Layer B | | |
|---|---|---|---|---|---|---|
| | IV (dl/g) | Fiber Diameter ($\mu$m) | METSUKE (g/m$^2$) | IV (dl/g) | Fiber Diameter ($\mu$m) | METSUKE (g/m$^2$) |
| Example 10 | 0.58 | 4.6 | 30 | 0.98 | 10.1 | 30 |
| Example 11 | 0.38 | 3.5 | 21 | 1.35 | 15.2 | 25 |
| Example 12 | 0.78 | 7.8 | 40 | 1.03 | 22.0 | 46 |
| Example 13 | 0.58 | 4.6 | 60 | — | — | — |
| Comp. Ex. 6 | — | — | — | 1.08 | 17.9 | 60 |
| Comp. Ex. 7 | — | — | — | 1.60 | 12.3 | 61 |

TABLE 7

| | Specific Surface Area (m$^2$/g) | Average Pore Size (nm) | Total Sulfur Content (mg/g) | Amount of Trapped Ammonia <Test Method 1> (mmol/g) | Ion Exchange Capacity (meq/g) | Capacity-holding Rate <Test Method 1> (%) | Tensile Strength (kgf/5 cm) |
|---|---|---|---|---|---|---|---|
| Example 10 | 5.0 | 1.7 | 15.9 | 0.290 | 0.055 | 81 | 7.1 |
| Example 11 | 5.0 | 1.8 | 9.6 | 0.290 | 0.075 | 79 | 9.0 |
| Example 12 | 2.9 | 1.7 | 4.4 | 0.220 | 0.020 | 76 | 16.4 |
| Example 13 | 8.0 | 1.7 | 16.6 | 0.293 | 0.050 | 80 | 2.3 |
| Comp. Ex. 6 | <0.1 | — | 0.8 | 0.088 | 0.055 | 33 | 17.5 |
| Comp. Ex. 7 | <0.1 | — | 0.7 | 0.044 | 0.039 | 25 | 19.8 |

Comparative Example 6

Two plies of a commercially available polypropylene non-woven fabric (ELTAS P03030, a product of Asahi Chemical Industry Co., Ltd., Japan) were superimposed and were integrated with each other by hot pressing at 130° C. The integrated laminate was immersed in a 95% concentrated sulfuric acid at 130° C. for 10 minutes for sulfonation to yield a separator.

The above-prepared separator was integrated into a battery, and the capacity-holding rate of the battery was determined. Properties of the separator and the capacity-holding rate of the battery are shown in Tables 6 and 7.

Comparative Example 7

Polypropylene resin chips were melted at 240° C. and the molten resin was extruded from nozzles into an air jet and was drawn into fibers according to a spun-bonding process. The resulting drawn fibers were randomly accumulated onto a screen conveyer to yield a non-woven fabric. The obtained non-woven fabric was sulfonated under the same condition as in Comparative Example 6 to yield a separator.

The above results show that the invented battery separator according to the second aspect has a satisfactory ammonia trapping property, and the resulting invented battery according to the fifth embodiment using this separator exhibits a reduced self-discharge. In addition, by employing ultrafine fibers in a layer A of the separator to have a further satisfactory particle- or ammonia-trapping property in combination with a layer B serving as a reinforcing layer, the resulting battery can avoid both problems in particle permeation and fiber breakage and can reduce the probability of occurrence of a short-circuit and have an increased reliability.

EXAMPLE 14

A material polypropylene resin was converted into a fiber and concurrently into a non-woven fabric by a melt-blowing process. Specifically, the polypropylene resin chips were melted in an extruder and were extruded from orifices at a head temperature of 220° C. at an extruding rate per orifice of 0.5 g/min. into a blowing stream of air at a temperature of 300° C. at a pressure of 0.8 kgf/cm$^2$ (7.8 N/cm$^2$). Concurrently with the formation of fibers, the resulting fibers were randomly accumulated on a screen conveyer to yield a non-woven fabric. The obtained non-woven fabric was subjected to hot pressing at 100° C. to yield a non-woven fabric having a METSUKE weight of 55 g/m², a thickness of 120 μm, and an average fiber diameter of 5 μm.

The above-prepared non-woven fabric was subjected to an oxidation treatment with an alternating current corona discharge and was then immersed in a 98% concentrated sulfuric acid at 95° C. for 60 minutes for sulfonation to yield a separator having an ion exchange capacity of 0.042 meq/g. The treatment with an alternating current corona discharge was performed with an alternating current high-frequency generator (a product of Kasuga Denki Co., Ltd., Japan, type HFSS-201, output frequency 30 kHz).

EXAMPLE 15

A polypropylene non-woven fabric having a METSUKE weight of 40 g/m², a thickness of 110 μm, and an average fiber diameter of 5 μm was prepared in the same manner as in Example 14.

The prepared non-woven fabric was subjected to an oxidation treatment with an alternating current corona discharge in the same manner as in Example 14 and was then exposed to an $SO_3$ gas at room temperature (25° C.) for 30 seconds for sulfonation to yield a separator having an ion exchange capacity of 0.043 meq/g.

EXAMPLE 16

A non-woven fabric made of a polyethylene resin and a polypropylene resin was prepared by a melt-blowing process. Specifically, the polyethylene resin chips and polypropylene resin chips were melted in an extruder and were alternately extruded from adjacent orifices at a head temperature of 220° C. at an extruding rate of the polypropylene resin per orifice of 0.5 g/min. and an extruding rate of the polyethylene resin per orifice of 0.1 g/min. into a blowing stream of air at a temperature of 300° C. at a pressure of 0.8 kgf/cm² (7.8 N/cm²). Concurrently with the formation of fibers, the resulting fibers were randomly accumulated to yield a non-woven fabric. The non-woven fabric was subjected to hot pressing at 100° C. to yield a non-woven fabric having a METSUKE weight of 53 g/m² and a thickness of 120 μm. In the resulting non-woven fabric, the polypropylene component had an average fiber diameter of 7 μm and the polyethylene component had an average fiber diameter of 1.5 μm.

The above-prepared non-woven fabric was irradiated with an ultraviolet ray using a low pressure mercury lamp for oxidation, and was then exposed to a 10% concentration fuming sulfuric acid at 40° C. for 5 minutes for sulfonation to yield a separator having an ion exchange capacity of 0.065 meq/g. In the above oxidation treatment, an ultraviolet irradiator (UMA-3012-TB, a product of Ushio Electric Inc., Japan) was used.

EXAMPLE 17

A material polypropylene resin was converted into a fiber and concurrently into a non-woven fabric by a melt-blowing process. Specifically, the polypropylene resin chips were melted in an extruder and were extruded from orifices at a head temperature of 210° C. at an extruding rate per orifice of 0.6 g/min. into a blowing stream of air at a temperature of 300° C. at a pressure of 0.8 kgf/cm² (7.8 N/cm²). Concurrently with the formation of fibers, the resulting fibers were randomly accumulated to yield a non-woven fabric. The obtained non-woven fabric was subjected to hot pressing at 100° C. to yield a non-woven fabric having a METSUKE weight of 40 g/m², a thickness of 120 μm, and an average fiber diameter of 8 μm.

The above-prepared non-woven fabric was subjected to an oxidation treatment with an ultraviolet ray irradiation by a low pressure mercury lamp and was then exposed to an $SO_3$ gas at room temperature (25° C.) for 30 seconds for sulfonation to yield a separator having an ion exchange capacity of 0.044 meq/g.

EXAMPLE 18

A material polypropylene resin was converted into a fiber and concurrently into a non-woven fabric by a melt-blowing process. Specifically, the polypropylene resin chips were melted in an extruder and were extruded from orifices at a head temperature of 210° C. at an extruding rate per orifice of 0.4 g/min. into a blowing stream of air at a temperature of 300° C. at a pressure of 0.8 kgf/cm² (7.8 N/cm²). Concurrently with the formation of fibers, the resulting fibers were randomly accumulated to yield a non-woven fabric. The non-woven fabric was subjected to hot pressing at 100° C. to yield a non-woven fabric having a METSUKE weight of 45 g/m², a thickness of 125 μm, and an average fiber diameter of 6 μm.

The above-prepared non-woven fabric was subjected to an oxidation treatment with an ultraviolet ray irradiation by a low pressure mercury lamp and was then immersed in a 98% concentrated sulfuric acid at 90° C. for 90 minutes for sulfonation to yield a separator having an ion exchange capacity of 0.045 meq/g.

Comparative Example 8

A separator was prepared in the same manner as in Example 14, except that an oxidation treatment with corona discharge was not performed.

Comparative Example 9

A separator was prepared in the same manner as in Example 15, except that an oxidation treatment with corona discharge was not performed.

Comparative Example 10

A separator was prepared in the same manner as in Example 16, except that an oxidation treatment with an ultraviolet ray irradiation (UV treatment) was not performed.

Comparative Example 11

A polypropylene non-woven fabric was prepared by a melt-blowing process in the same manner as in Example 14. A benzophenone sensitizer and acrylic acid monomer were allowed to penetrate into the inside of the non-woven fabric by vacuum deaeration. Two plies of a polypropylene film were made in close contact with both surfaces of the treated non-woven fabric, and the resulting non-woven fabric was irradiated with an ultraviolet ray using the irradiator used in Example 16 for oxidation. Residual monomers in the irradiated non-woven fabric were then completely eliminated by washing the non-woven fabric with water to yield a separator.

Each of the separators according to Examples 14 to 18 and Comparative Examples 8 to 11 was then integrated into a battery. Properties of the separators, and the capacity-holding rate of the resulting batteries were determined. The results are shown in Table 8.

TABLE 8

| | Non-woven Fabric | Surface Oxidation | O/C Ratio (%) After Surface Oxidation | Surface Treatment for Hydrophilicity |
|---|---|---|---|---|
| Example 14 | PP | corona treatment | 2.8 | sulfuric acid |
| Example 15 | PP | corona treatment | 0.2 | $SO_3$ gas |
| Example 16 | PE/PP | UV treatment | 5.6 | fuming sulfuric acid |
| Example 17 | PP | UV treatment | 10 | $SO_3$ gas |
| Example 18 | PP | UV treatment | 9.2 | sulfuric acid |
| Comp. Ex. 8 | PP | none | no treatment, <0.1 | sulfuric acid |
| Comp. Ex. 9 | PP | none | no treatment, <0.1 | $SO_3$ gas |
| Comp. Ex. 10 | PE/PP | none | no treatment, <0.1 | fuming sulfuric acid |
| Comp. Ex. 11 | PP | — | — | grafting |

| | Ammonia Trapping Rate (%) | | Battery Capacity-holding Rate (%) | |
|---|---|---|---|---|
| | Test Method 1 45° C., 72 hr. | Test Method 2 60° C., 72 hr. | Test Method 1 45° C., 7 days | Test Method 2 60° C., 72 hr. |
| Example 14 | 100 | 99 | 83 | 82 |
| Example 15 | 95 | 88 | 77 | 76 |
| Example 16 | 93 | 81 | 72 | 70 |
| Example 17 | 99 | 93 | 79 | 78 |
| Example 18 | 99 | 96 | 80 | 79 |
| Comp. Ex. 8 | 79 | 77 | 58 | 57 |
| Comp. Ex. 9 | 76 | 73 | 57 | 55 |
| Comp. Ex. 10 | 74 | 70 | 59 | 53 |
| Comp. Ex. 11 | 64 | 56 | 45 | 39 |

PP: Polypropylene
PE: Polyethylene
UV treatment: Oxidation treatment with UV irradiation
O/C Ratio: Molar ratio of oxygen atoms to carbon atoms (degree of oxidation)

Table 8 indicates that the invented battery separator according to the third aspect is capable of selectively trapping and eliminating a trace concentration of ammonia of about 10–4 that of potassium hydroxide and can retain a satisfactory ammonia trapping property even at high temperatures of 60° C. or more. The invented process for producing a separator according to the fourth aspect can provide the above separator having a satisfactory ammonia trapping property and can therefore provide the invented battery according to the fifth aspect exhibiting a minimized self-discharge.

This application is based on patent application Nos. 11-96545, 11-96546, 11-318840 and 10-288360 filed in Japan, the contents of which are hereby incorporated by reference.

The battery separators, the production process for a battery separator, and the alkaline battery according to the invention are described above in detail with reference to several invented examples and comparative examples, which are not intended to limit the scope of the invention. Other embodiments and variations will be obvious to those skilled in the art, and this invention is not to be limited to the specific matters stated above.

What is claimed is:

1. A separator for a battery comprising:
   a sulfonated fiber, said sulfonated fiber being obtained by sulfonating a polyolefin resin fiber and having a specific surface area of 0.5 m²/gram or more as determined according to the Brunauer-Emmett-Teller method,
   an ammonia trapping non-woven fabric (A) mainly containing said sulfonated fiber, and
   a reinforcing non-woven fabric (B) composed of a material different from that of said ammonia trapping non-woven fabric (A).

2. A separator for a battery according to claim 1, wherein said reinforcing non-woven fabric (B) mainly comprises a fiber obtained by sulfonating a polyolefin resin fiber having an intrinsic viscosity number of more than 1.0 dl/gram.

3. A separator for a battery according to claim 1, wherein said reinforcing non-woven fabric (B) mainly comprises a polyolefin resin fiber having a total sulfur content of more than 0 mg and equal to or less than 7 mg per 1 gram of the fiber.

4. A separator for a battery according to claim 1, wherein said main component fiber in said ammonia trapping non-woven fabric (A) has a total sulfur content of more than 10 mg and equal to or less than 50 mg per 1 gram of the fiber.

5. A separator for a battery according to claim 1, wherein said ammonia trapping non-woven fabric (A) comprises 20% by mass or more of said sulfonated fiber based on the total mass of the separator.

6. A separator for a battery according to claim 1, wherein said ammonia trapping non-woven fabric (A) has a total sulfur content of 150 mg/m² or more.

7. A separation for a battery according to claim 1, wherein said ammonia trapping non-woven fabric (A) has a bulk density of 0.5 g/cm³ or more, and said reinforcing non-woven fabric (B) has a bulk density of 0.4 g/cm³ or less.

8. A separator for a battery according to claim 1, wherein fibers constituting said ammonia trapping non-woven fabric (A) have an average fiber diameter of 1 to 10 μm, and fibers constituting said reinforcing non-woven fabric (B) have an average fiber diameter of 10 μm or more.

9. A separator for a battery according to claim 1, wherein fibers constituting said reinforcing non-woven fabric (B) have a rectangular or elliptic cross section.

* * * * *